Figure 1:
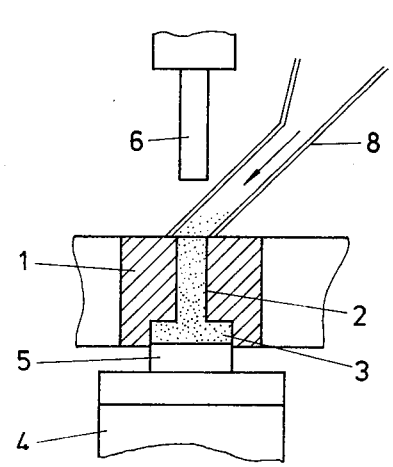

United States Patent
Hakka

[11] 3,811,877
[45] May 21, 1974

[54] METHOD FOR MANUFACTURING ANTI-SKID MEANS INTENDED FOR VEHICLE TIRES

[75] Inventor: Lennart Hakka, Helsinki, Finland
[73] Assignee: Oy Airam AB, Helsinki, Finland
[22] Filed: Apr. 27, 1972
[21] Appl. No.: 248,024

[52] U.S. Cl.................. 75/208 R, 29/525, 29/447, 75/203, 75/204, 75/214, 152/210
[51] Int. Cl............................................. B22f 5/00
[58] Field of Search ............ 29/525, 447; 152/210; 75/208 R, 203, 204, 214

[56] References Cited

UNITED STATES PATENTS
| | | | |
|---|---|---|---|
| 3,301,300 | 1/1967 | Natter | 152/210 |
| 2,913,819 | 11/1959 | Andreotti et al. | 75/208 R |
| 2,652,520 | 9/1953 | Studders | 75/208 R |
| 3,477,490 | 11/1969 | Carlstedt | 152/210 |

Primary Examiner—Carl D. Quarforth
Assistant Examiner—B. Hunt
Attorney, Agent, or Firm—Richards & Geier V. Alexander Scher

[57] ABSTRACT

A method for manufacturing anti-skid means for vehicle tires consists essentially of the following steps:

Metal powder is supplied into a mould.

The mouth of the mould is closed by a plunger which has a rod located centrally within the plunger. The plunger is depressed into the powder inside the mould so as to form a hole.

Pre-compression is carried out in the mould.

The rod is pulled up and a hard metal insert is introduced into the mould.

The rod is used to press the insert into correct position.

Final compression is carried out in the mould. At the bottom part of the mould the base of the anti-skid means is formed.

The completed anti-skid means are removed from the mould.

3 Claims, 7 Drawing Figures

METHOD FOR MANUFACTURING ANTI-SKID MEANS INTENDED FOR VEHICLE TIRES

The object of the present invention is a method for manufacturing means counteracting skidding, intended for vehicle tires, comprising a metallic body provided with a tip of hard metal, in which method said body is formed of metal powder, such as steel or iron powder, in a mould by pressing and sintering.

It has been common practice in methods of the kind mentioned, first to prepare the body, into a hole in which the tip of hard metal has been affixed by pressing or brazing. A method is also known in prior art wherein at the process of manufacturing the body the tip of hard metal is simultaneously fixed in position. In that instance invariably a mould has been used in the mouth portion of which the base of the anti-skid means will be formed. It has been found, however, that no properly serviceable anti-skid means are obtained by the method described.

This is because the means is likely to suffer rupture at the point where the end of the hard metal insert is located within the body. This is due to the fact that no uniform pressure has been achieved in the process of forming the body by pressing. In the method of prior art, a rod has been pushed into the mould in order to form the hole for the hard metal insert, and this has been done prior to closing the mouth portion of the mould. As a result, the material feed height in the mould will be rather great. It has been inconvenient to make the hole and to insert the hard metal tip in the hole, because these operations have been performed through the bottom of the mould.

The aim of the present invention is to present a method for manufacturing anti-skid means which is free of the drawbacks mentioned above. The invention is mainly characterized in that the method comprises the following steps:

1. Metal powder is introduced into a mould, in the bottom part of which the base of the anti-skid means will be formed;
2. The mouth of the mould is closed with a plunger 6, whereupon a rod 7 situated centrally in said plunger 6 is depressed into the powder in the mould in order to produce a hole for the hard metal insert 12;
3. Pre-compression is carried out in the mould;
4. The rod 7 in said plunger is lifted up and through the hole in the plunger the hard metal insert 12 is introduced into the mould;
5. Said plunger 6 is used to press the insert into correct position;
6. Final pressing is carried out in the mould, and the anti-skid means thus produced is removed.

It is advantageous if, after filling the mould, the piston constituting the bottom of the mould is pressed upwardly a certain distance, before the upper end of the mould is closed. It is advantageous to perform the pre-compression as well as the final pressing in such manner that pressure is exerted on the mould both from above and from below. It is expressly due to the fact that in a method according to the invention the base of the means will be formed on the bottom of the mould and the producing of the hole for the hard metal insert takes place while the mould is closed, that more uniform pressure is obtained than before and that the material feed height in the mould will be lower. Therefore, an anti-skid means manufactured in this manner has greater strength and durability than antiskid means manufactured according to methods of prior art. The manufacturing of anti-skid means is also more conveniently managed than before, because the hole for the hard metal insert is made in the body from above downwardly. Thereby the making of the hole and placing of the hard metal tip becomes an easy process.

Figure 2:
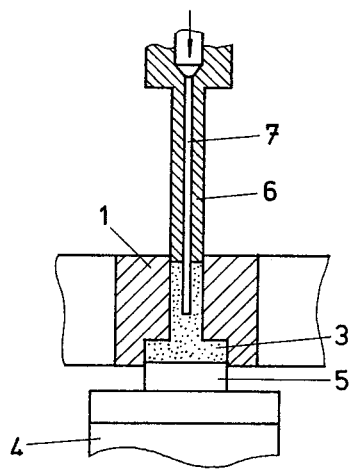
Figure 3:
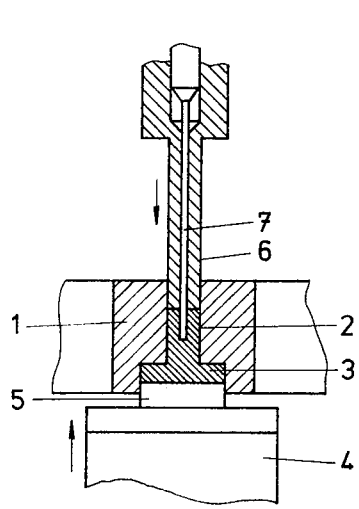
Figure 5:
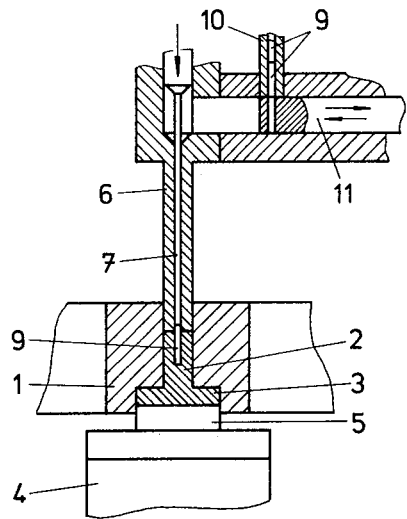
Figure 6:
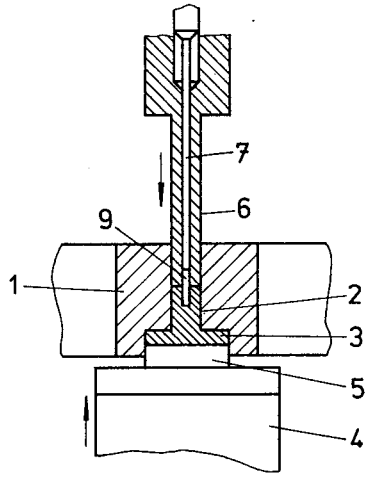

The invention is described in closer detail with reference to the attached drawings. In the drawing, FIG. 1 represents the filling step in a method according to the invention, FIG. 2 the hole making step, FIG. 3 the pre-compression step, FIG. 4 the hard metal tip inserting step, FIG. 5 the second hard metal tip inserting step, FIG. 6 the pressing step, and FIG. 7 the anti-skid means removing step, all these performed by the aid of a suitable press, which has been presented partly in section.

The method according to the invention is described by the aid of the press as shown in the figures. It comprises the mould body 1, which has an upwardly open, tubular duct 2 consistent with the desired shape of the stem of the body of the anti-skid means and which continues at its lower end as a wider, enlarged portion 3 consistent with the desired shape of the base of the means and which has no bottom. Said enlarged portion is closable by means of a piston 5 constituting part of the press 4 and which fits into said enlarged portion. The duct 2 of the mould is closable at its upper end by means of a piston 6 constituting part of the press. This piston is pierced by a vertical duct, wherein a rod 7 can be moved, this moving being done by the aid of a separate press component. All other details of the devices will be understood from the subsequent description of the method.

At the first step of the method (FIG. 1) the piston 5 closes the enlarged portion 3 in the bottom part of the mould body, but the duct 2 in the mould body is open at its upper end. Metal powder, such as steel or iron powder, is introduced into the mould through a feed tube 8. It is advantageous if, upon completed filling, the piston 5 closing the bottom of the mould is moved upwardly through a certain distance, while the mouth of the mould is open.

In the second method step the piston 6 of the press above the mould is depressed so as to close the upper end of the duct 2, and the rod 7 situated within this piston 6 and for which a depressing means of its own has been provided, is pressed to such depth in the duct 2 at which it is desired that the bottom end of the hard metal insert will lie.

Figure 4:
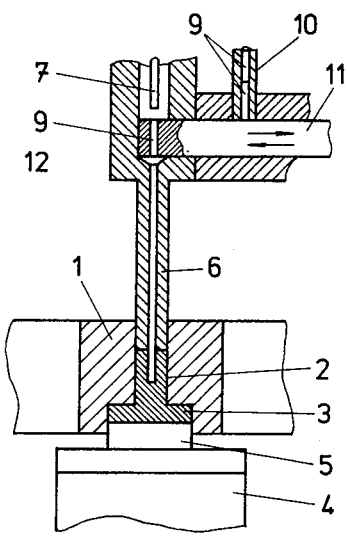

The third step consists of pre-compression of the powder in the mould. This is accomplished by exerting on the filled mould a pressure from above as well as below. This is done with the aid of the pistons 6 and 5 closing the mould. By means of the pre-compression the metal powder in the mould is caused to form a body of such coherence that it will maintain its shape. It is therefore possible to pull up the rod 7 residing in the piston on top of the mould. In the fourth method step, the hard metal tip is inserted into the hole in the body that has been formed in the mould, that is the body of the anti-skid means. This step is illustrated by FIG. 4. The hard metal insert 9 is fed through the tube 10 into the hole 12 in the pusher 11. The pusher 11 is then moved into a position such that the hard metal insert 9 residing in it will be located over the vertical duct in the press piston on top of the mould (FIG. 4). In the subsequent, fifth, step of the method the rod 7 is used to depress the hard metal insert 9 into the hole in the mould.

Figure 7:
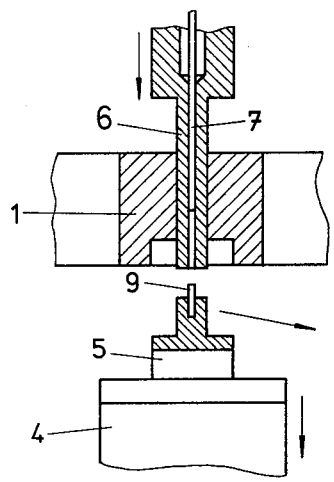

Final pressing is then carried out by applying pressure to the pistons 5 and 6 closing the mould, so that the desired height of pressure is attained. The anti-skid means is now completed and ready to be removed from the mould (FIG. 7). The anti-skid means prepared in this manner are furthermore subjected to a sintering process, which is carried out in a manner previously known in itself.

I claim:

1. Method for manufacturing anti-skid means intended for vehicle tires, comprising a metallic body provided with a hard metal tip, in which method said body is formed of metal powder, such as steel or iron powder, in a mould by filling same without substantial pressure thereon and followed by sintering wherein said method comprises the following steps:
   1. feeding metal powder into a mould in the bottom part of which the base of the anti-skid means will be formed;
   2. closing the mouth of the mould with a plunger (6), without exerting any substantial pressure on the powder within said mould, whereupon a rod (7) situated centrally in said plunger (6) is depressed into the powder in the mould in order to produce a hole for the hard metal insert (9);
   3. pre-compressing in the powder in the mould;
   4. pulling up the rod (7) residing in said plunger introducing through the hole in the plunger the hard metal insert (9) into the mould;
   5. pressing the insert into correct position with said rod (7);
   6. finally compressing the powder in the mould, removing the anti-skid means thus formed; and the sintering the press form.

2. Method according to claim 1, characterized in that, prior to closing the mouth of the mould, the piston (5) constituting the bottom of the mould is pushed upwardly a certain distance.

3. Method according to claim 1, characterized in that pressure is caused in the mould both from above and from below.

* * * * *

UNITED STATES PATENT OFFICE
CERTIFICATE OF CORRECTION

Patent No. 3,811,877      Dated May 21, 1974

Inventor(s) Lennart Häkkä

It is certified that error appears in the above-identified patent and that said Letters Patent are hereby corrected as shown below:

On the cover sheet insert

[30] Foreign Application Priority Data

April 29, 1971    Finland    1204/71

Signed and sealed this 8th day of October 1974.

(SEAL)
Attest:

McCOY M. GIBSON JR.
Attesting Officer

C. MARSHALL DANN
Commissioner of Patents